US007017080B1

(12) United States Patent
Liggesmeyer et al.

(10) Patent No.: US 7,017,080 B1
(45) Date of Patent: Mar. 21, 2006

(54) METHOD AND SYSTEM FOR DETERMINING A FAULT TREE OF A TECHNICAL SYSTEM, COMPUTER PROGRAM PRODUCT AND A COMPUTER READABLE STORAGE MEDIUM

(75) Inventors: Peter Liggesmeyer, Potsdam (DE); Oliver Maeckel, Munich (DE); Michael Rettelbach, Erlangen (DE); Martin Rothfelder, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/979,840

(22) PCT Filed: May 26, 2000

(86) PCT No.: PCT/DE00/01717

§ 371 (c)(1),
(2), (4) Date: Feb. 19, 2002

(87) PCT Pub. No.: WO00/73903

PCT Pub. Date: Dec. 7, 2000

(30) Foreign Application Priority Data

Jun. 2, 1999 (DE) ................................ 199 25 424

(51) Int. Cl.
*G06F 11/00* (2006.01)

(52) U.S. Cl. ........................................... 714/26; 714/47

(58) Field of Classification Search .................. 714/26, 714/47
See application file for complete search history.

(56) References Cited

U.S. PATENT DOCUMENTS

| | | | | |
|---|---|---|---|---|
| 4,649,515 | A * | 3/1987 | Thompson et al. | 706/52 |
| 5,483,637 | A * | 1/1996 | Winokur et al. | 714/26 |
| 6,324,659 | B1 * | 11/2001 | Pierro | 714/48 |

FOREIGN PATENT DOCUMENTS

| | | | |
|---|---|---|---|
| DE | 19507134 | C1 | 7/1996 |
| DE | 19523483 | C2 | 10/1998 |
| DE | 19713917 | A1 | 10/1998 |

OTHER PUBLICATIONS

Information zum Werkzeug IQ-FMEA (Information relating to the IQ-FMEA Tool), APIS Informationstechnologien GmbH, Jena, 1998.

H. Zebedin, FMEA aus Sicht eines Motorenentwicklers, Qualität und Zuverlässigkeit (FMEA from the Angle of a Motor Developer, Quality and Reliability), QZ 43 , pp. 826 ff., Carl Hanser Verlag, Munich, 1998.

(Continued)

*Primary Examiner*—Bryce P. Bonzo
(74) *Attorney, Agent, or Firm*—Staas & Halsey LLP

(57) ABSTRACT

The faults are described using a fault description which comprises data which have been determined using failure modes and effects analysis. The fault description is extended by information regarding the dependency of possible faults and the frequency of occurrence of said faults. The extended fault description is used to ascertain, for a prescribed fault event, the fault tree and the frequency of occurrence of the fault event.

17 Claims, 6 Drawing Sheets

OTHER PUBLICATIONS

N. Leveson, Safety verification of ADA-Programs using Software Fault Trees, IEEE Software, pp. 48-59, Jul. 1991.
DIN 25424-1: Fehlerbaumanalysen; Methoden und Bildzeichen (Fault Tree Analyses; Methods and Graphic Symbols), Sep. 1981.
DIN 25424-2: Fehlerbaumanalyse; Handrechenverfahren zur Auswertung eines Fehlerbaums (Fault Tree Analysis; Manual Computation Methods for Evaluating a Fault Tree), Berlin, Beuth Verlag GmbH, Apr. 1990.
Fournier E. et al.: "Probabilistic Reliability Study of an Automatic Welding Unit", Automation in Manufacturing Industry Automatic Production Conference 1986, Paris, France, May 28-30, 1986, pp. 186-190.
Kocza G. et al.: "Integrated Reliability Analysis System (IRAS)", Quality and Reliability Engineering International, Sep.-Oct. 1996, Wiley, UK, vol. 12, No. 5, pp. 371-381.
JP0060095881AA, Abstract, published on Apr. 8, 1994.

* cited by examiner

METHOD AND SYSTEM FOR DETERMINING A FAULT TREE OF A TECHNICAL SYSTEM, COMPUTER PROGRAM PRODUCT AND A COMPUTER READABLE STORAGE MEDIUM

CROSS REFERENCE TO RELATED APPLICATIONS

This application is based on and hereby claims priority to German Application No. 199 25 424.9 filed on Jun. 2, 1999 in Germany and PCT Application No. PCT/DE00/01717 filed on May 26, 2000, the contents of which are hereby incorporated by reference.

BACKGROUND OF THE INVENTION

The invention relates to a method, a system, a computer program and a computer-readable storage medium for ascertaining a fault tree for a technical system.

Such a method and such a system are known from N. Leveson, Safety verification of ADA-Programs using Software Fault Trees, IEEE Software, pages 48–59, July 1991 ("Leveson").

Leveson discloses the practice of using computers to ascertain a fault tree for a computer program. For the computer program, a control flow description is ascertained in the form of a control flowchart. For various program elements of the computer program, a stored fault description associated with a respective stored reference element is used to ascertain an element fault description. The fault description for a reference element describes possible faults for the respective reference element. The element fault descriptions in the form of element fault trees are used to ascertain the fault tree, taking into account the control flowchart.

The method and the system from Leveson have the following drawbacks, in particular. The fault tree ascertained is incomplete in terms of the faults examined and the causes thereof, and is therefore unreliable. Hence, this practice is not appropriate for use within the context of generating fault trees for safety-critical applications. The individual fault trees associated with the reference elements are also incomplete and hence unreliable.

DIN 25424-1: Fehlerbaumanalysen; Methoden und Bildzeichen (Fault Tree Analyses; Methods and Graphic Symbols), September 1981 ("DIN '424-1") discloses principles relating to a fault tree. A fault tree is to be understood, as described in DIN '424-1, to mean a structure which describes logical relationships between input variables for the fault tree, which input variables lead to a prescribed and desirable result.

In addition, DIN 25424-2: Fehlerbaumanalyse; Handrechenverfahren zur Auswertung eines Fehlerbaums (Fault Tree Analysis; Manual Computation Methods for Evaluating a Fault Tree), Berlin, Beuth Verlag GmbH, April 1990 discloses various methods for fault tree analysis.

Further, H. Zebedin, FMEA aus Sicht eines Motorenentwicklers, Qualität und Zuverlässigkeit (FMEA from the Angle of a Motor Developer, Quality and Reliability), QZ 43, pp. 826 ff., Carl Hanser Verlag, Munich, 1998 discloses principles relating to "failure modes and effects [and criticality] analysis" (FME[C]A) for a technical system. The aim of failure modes and effects analysis is to recognize risks and problem areas in a technical system, to identify fault potentials, to quantify risks and to reduce work regarding mistakes. As is evident, failure modes and effects analysis is a method for spotting faults in the hardware and software design and development phase. Faults possibly underlying a technical system are listed manually and effects of the respective fault occurring are determined, normally including the damage which may arise on account of the fault. In addition, failure modes and effects analysis includes highlighting possible measures for preventing the respective fault. Failure modes and effects analysis is particularly suitable for documenting and transferring technical knowledge, for example in service sectors for maintaining a technical system. A distinction is drawn between design-related failure modes and effects analysis and process-related failure modes and effects analysis. In the case of design-related failure modes and effects analysis, individual components of the technical system are examined for incorrect action by them. The content of process-related failure modes and effects analysis is a technical system's development and manufacturing process. If failure modes and effects analysis involves examining not just the individual components of the technical system, but also the relationships between the malfunctions of the components in the entire system, then the failure modes and effects analysis is referred to as system-related failure modes and effects analysis. Process-related failure modes and effects analysis may extend into system-related failure modes and effects analysis if effects of faults in the production process appear as causes of faults in the system-related failure modes and effects analysis (for example lines rubbing on moving parts on account of missing cable ties).

System-related failure modes and effects analysis makes it possible to use the cause/effect relationships between the components of the technical system to build fault chains which can be represented in the form of fault networks.

To perform system-related failure modes and effects analysis, the following steps are normally carried out:

1. Define System Components and System Structure

The system to be examined is broken down into its components. The components are in turn broken down into subcomponents, which gives a hierarchical relationship between the individual components which respectively indicates which subcomponents a component in the technical system comprises. The components of the technical system are also referred to as structural elements of the technical system. A structure tree is ascertained on the basis of the relationships between the components.

2. Define Functions of the Components

The function of each component defined in the system structure is described. In this context, the function of a subcomponent is a subfunction of the respective superordinate component.

3. Perform Fault Analysis

Every function of a component has corresponding malfunctions associated with it which describe faults which may occur with the component. The effects of the faults can then be found as a malfunction in the respective superordinate component. The causes of faults in a component are listed as malfunctions in the subcomponents.

4. Risk assessment

With failure modes and effects analysis, a risk of a fault is expressed by a risk priority number (RPN).

$$RPN=B\times A\times E,$$

where

B denotes a significance of the fault, with a range of [1, 10] normally being used (a value of 1 denotes an insignificant fault and a value of 10 denotes a very significant fault with respect to a prescribed criterion);

A denotes a frequency of occurrence of the fault, again using a range of [1, 10], where a value of 1 denotes a very low frequency of occurrence and a value of 10 denotes a very high frequency of occurrence;

E denotes a likelihood of the fault being discovered, said likelihood being able to adopt a value between [1, 10], where a value of 1 indicates that the fault is always discovered and a value of 10 indicates that the fault generally remains undiscovered.

1. Improving the System

On the basis of the evaluation of the RPN, alterations should be made to the technical system.

For computer-assisted implementation of failure modes and effects analysis, Information zum Werkzeug IQ-FMEA (Information relating to the IQ-FMEA Tool), APIS Informationstechnologien GmbH, Jena, 1998 discloses a computer program which is referred to below as IQ-FMEA. IQ-FMEA contains both a structure editor and a function editor, and a fault analysis editor. These editors are used to describe a hierarchical structure for the technical system. This structure comprises the components and the functions and malfunctions thereof. In addition, IQ-FMEA contains a "form editor", which allows possible faults, causes of faults, effects of faults and preventive measures to be documented for the respective component in the technical system.

A drawback of the manually produced failure modes and effects analysis and also of possible manual creation of a fault tree is, in particular, the unreliability of the fault description obtained from the failure modes and effects analysis and manual creation of the fault tree. Particularly in the case of safety-critical technical systems, this results in an intolerable risk in the assessment of possible faults which can occur in the technical system.

SUMMARY OF THE INVENTION

One aspect of the invention is therefore based on the problem of ascertaining a fault tree for a technical system using a computer, to thereby ensure a more reliable fault description for the technical system as compared with the known method.

A computer-executed method for ascertaining a fault tree for a technical system is based on a fault description which describes faults which can occur in the technical system. The fault description comprises data which have been determined using failure modes and effects analysis. The fault description is extended by information regarding the dependency of possible faults on one another and the frequency of occurrence of said faults. The extended fault description is used to ascertain, for a prescribed fault event, the fault tree describing the dependencies of possible faults which can lead to the fault event, and the frequency of occurrence of the fault event.

The system for ascertaining a fault tree for a technical system has a processor which is set up such that the following steps can be carried out:

a) faults which can occur in the technical system are described using a fault description, b) the fault description comprises data which have been determined using failure modes and effects analysis, c) the fault description is extended by information regarding the dependency of possible faults on one another and the frequency of occurrence of said faults, d) the extended fault description is used to ascertain, for a prescribed fault event, the fault tree describing the dependencies of possible faults which can lead to the fault event, and the frequency of occurrence of the fault event.

A computer program comprises a computer-readable storage medium on which a program is stored which, after it has been loaded into a memory in a computer, allows the computer to carry out the following steps for ascertaining a fault tree for a technical system:

a) faults which can occur in the technical system are described using a fault description, b) the fault description comprises data which have been determined using failure modes and effects analysis, c) the fault description is extended by information regarding the dependency of possible faults on one another and the frequency of occurrence of said faults, d) the extended fault description is used to ascertain, for a prescribed fault event, the fault tree describing the dependencies of possible faults which can lead to the fault event, and the frequency of occurrence of the fault event.

A computer-readable storage medium stores a program which, when it has been loaded into a memory in a computer, allows the computer to carry out the following steps for ascertaining a fault tree for a technical system:

a) faults which can occur in the technical system are described using a fault description, b) the fault description comprises data which have been determined using failure modes and effects analysis, c) the fault description is extended by information regarding the dependency of possible faults on one another and the frequency of occurrence of said faults, d) the extended fault description is used to ascertain, for a prescribed fault event, the fault tree describing the dependencies of possible faults which can lead to the fault event, and the frequency of occurrence of the fault event.

One aspect of the invention results, in particular, in a reduction in the computation complexity required for producing a fault tree and in an increase in the reliability of the fault tree ascertained for the technical system. The combination of failure modes and effects analysis with the standardized presentation of a fault description for a technical system in the form of a fault tree provides a simplified, standardized method for fault tree analysis.

In addition, one advantage can be seen in that a uniform database is used for failure modes and effects analysis and for ascertaining the fault tree. It is therefore not necessary to produce an additional model relating to the technical system in order to ascertain the fault tree. Results from the failure modes and effects analysis together with the complementary details used for extended fault description can now be used to ascertain a fault tree.

The fact that a fault tree for a prescribed event is automatically ascertained from data resulting from failure modes and effects analysis means that it is also possible to include alterations within the technical system very flexibly and easily in the respective fault tree.

The refinements described below apply to the method, the system, the computer program and to the computer-readable storage medium.

The fault tree can be ascertained by taking the fault event as a basis for ascertaining all the possible faults which can lead to the fault event on a descending hierarchical level of the fault description until elemental faults which themselves can no longer be caused by other faults have been ascertained for all faults. For each elemental fault, the frequency of occurrence of the elemental fault is ascertained. On the basis of the frequencies of occurrence, the frequency of occurrence of the fault event is determined.

This practice implicitly performs a consistency check for the failure modes and effects analysis, since the practice described above automatically results in consistency errors in the failure modes and effects analysis.

The above method and system is suitable for use for fault analysis in the technical system.

In one refinement, the fault tree is altered in terms of prescribable boundary conditions. This can be done by adding a complementary fault tree.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
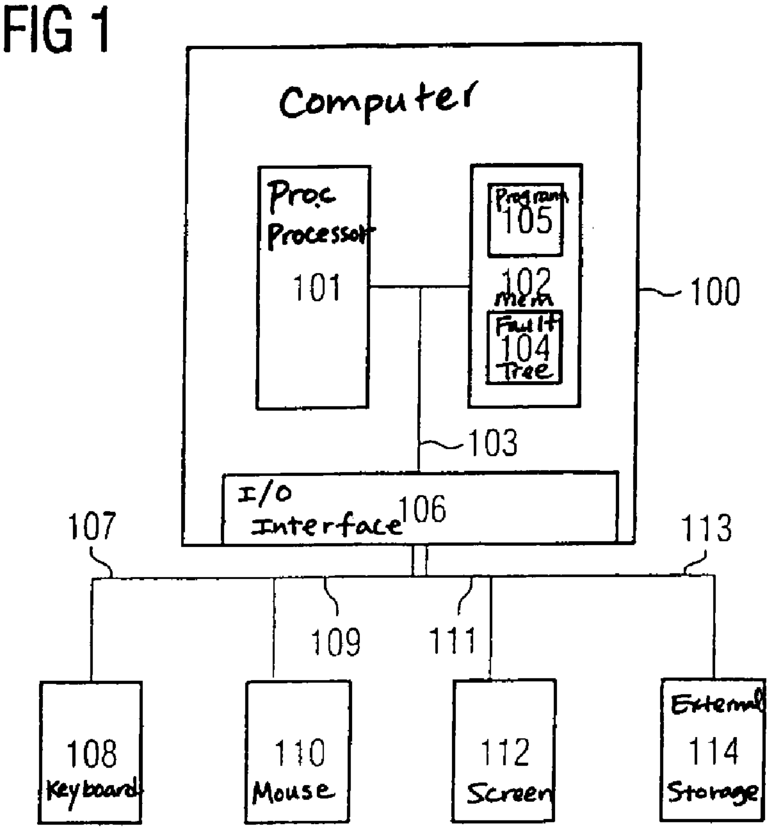
FIG. 1 shows a sketch of a computer used to carry out the method based on the exemplary embodiment.
Figure 2:
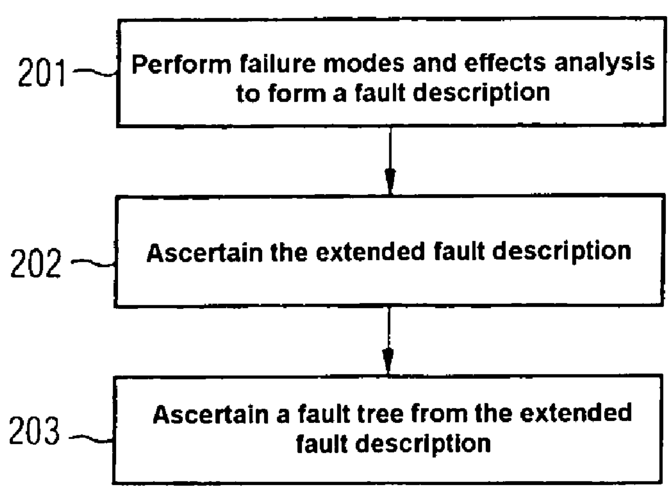
FIG. 2 shows a flowchart showing the individual method steps of the exemplary embodiment.

Reference will now be made in detail to the preferred embodiments of the present invention, examples of which are illustrated in the accompanying drawings, wherein like reference numerals refer to like elements throughout.

FIG. 1 shows a computer 100 used to carry out the method described below.

The computer 100 has a processor 101 which is connected to a memory 102 via a bus 103. The bus 103 also has an input/output interface 106 connected to it.

The memory 102 stores a computer program 104 for which a fault tree is ascertained in the manner described below. In addition, the memory 102 stores a program 105 which implements the method described below.

The input/output interface 106 has a keyboard 108 connected to it via a first connection 107. A second connection 109 is used to connect the input/output interface 16 to a computer mouse 110, and a third connection 111 is used to connect the input/output interface 106 to a screen 112 on which the fault tree ascertained for the technical system is displayed. A fourth connection 113 is used to connect the input/output interface 106 to an external storage medium 114.

The exemplary embodiment described below is based on an FD-Thorax (a medical diagnostic instrument) as the technical system, in particular using the component of a follower control device for the FD-Thorax.

Failure modes and effects analysis is carried out manually for the technical system. The result of the failure modes and effects analysis is a fault description for the technical system FD-Thorax, which fault description is used hold possible faults of the system, the possible causes of said faults, the possible effects of said faults and possible damage which can be caused by the respective fault (step 101).

The fault description is used to ascertain an extended fault description by adding information regarding the dependency of possible faults on one another and the frequency of occurrence of said faults (step 202).

The extended fault description is used to ascertain, for a prescribed fault event, a fault tree which describes the dependency of possible faults which can lead to the fault event. In addition, the frequency of occurrence of the prescribed fault event is ascertained (step 203).

Figure 3A:
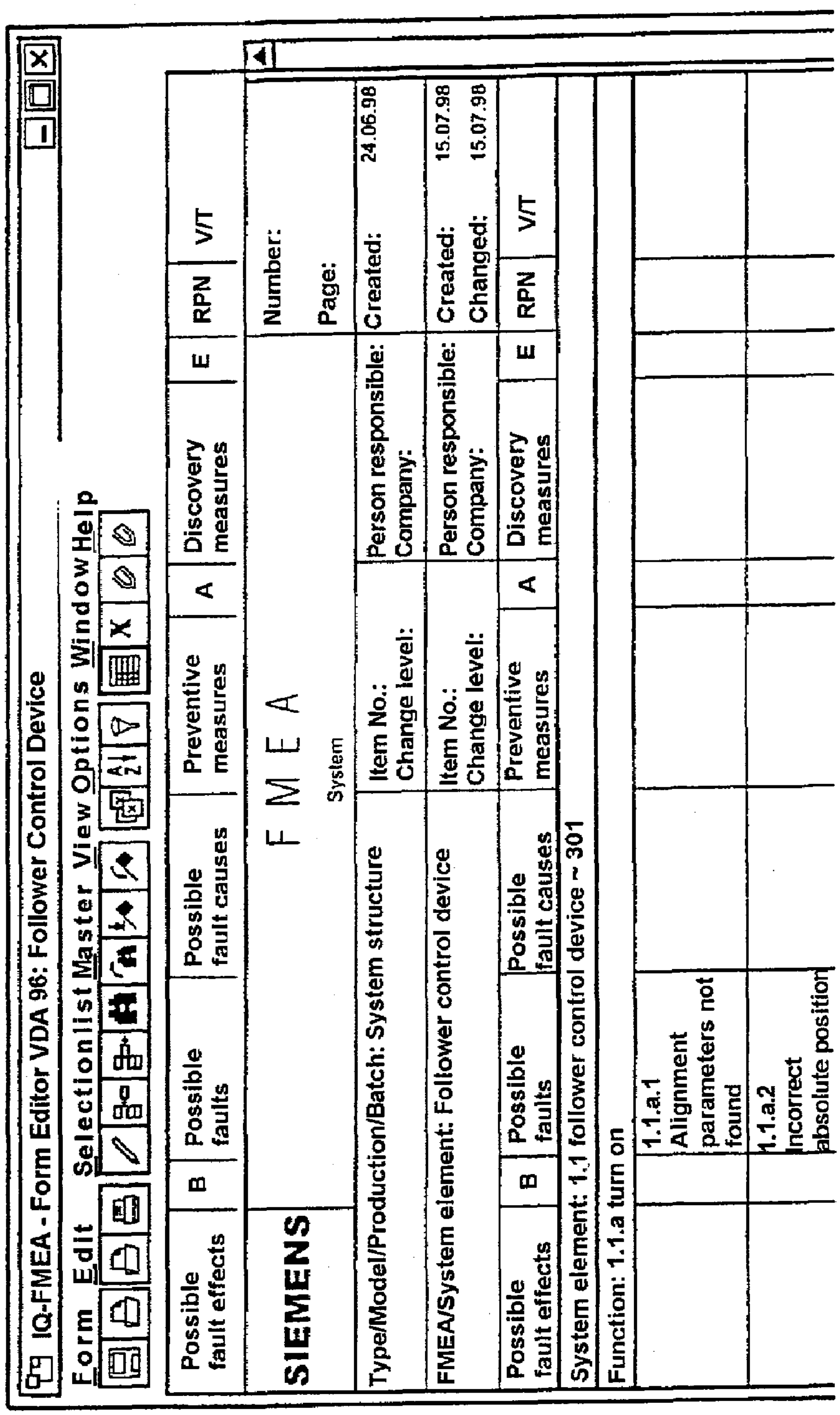
FIGS. 3A, 3B and 3C show views of a form editor in IQ-FMEA, in which individual faults possible in the technical system have been entered in accordance with the exemplary embodiment.
Figure 3B:
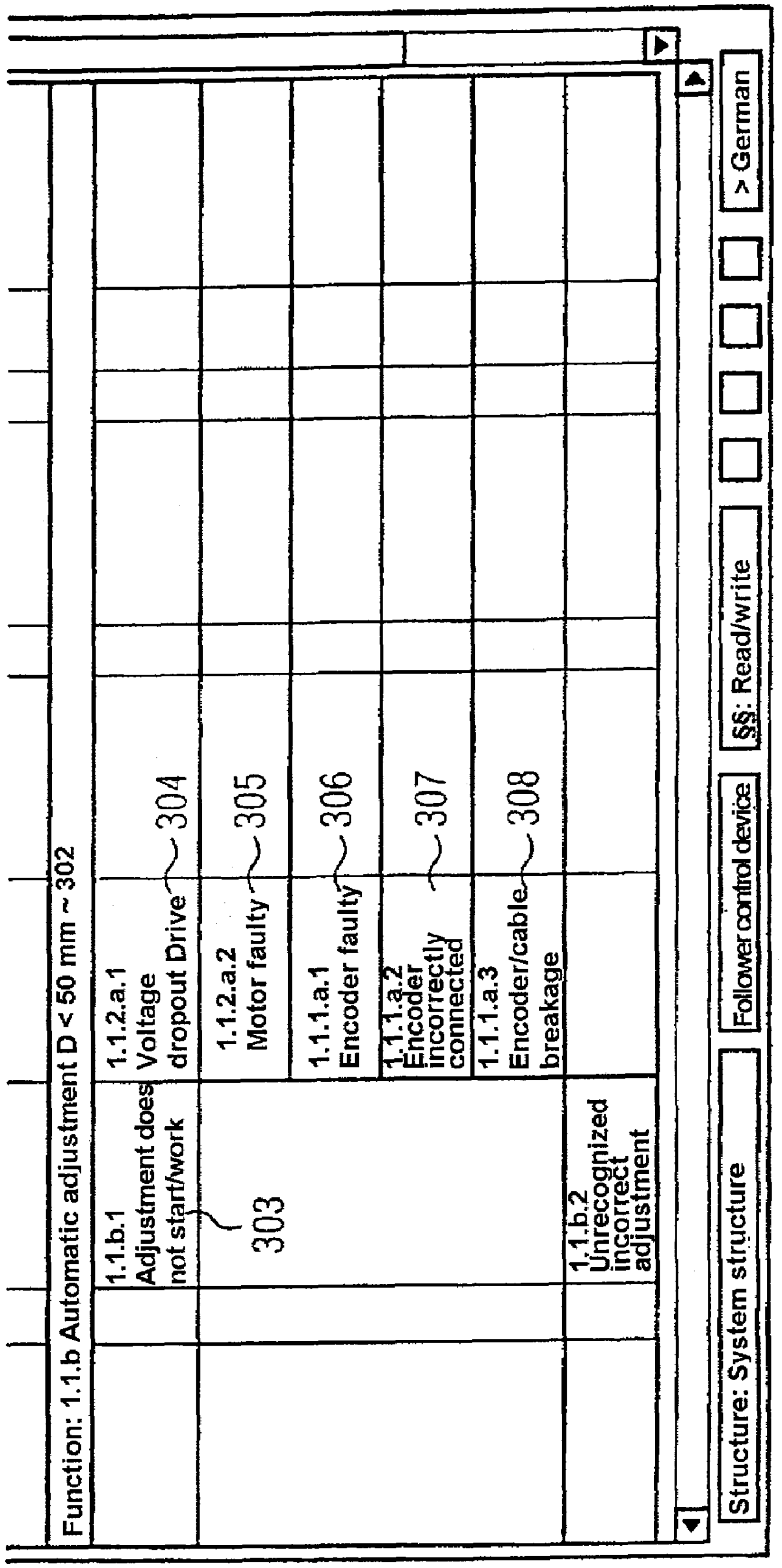

FIGS. 3A and 3B show, for the follower control device component of the FD-Thorax instrument, a view of a form editor from IQ-FMEA, in which individual fault instances and causes of faults are shown for various functions.

All the components of the technical system and also functions and malfunctions are given numbers using the following nomenclature:

ne1[.ne2.,.nek].af.nff ne1 . . . k denotes a respective number for the component on the hierarchical level 1 . . . k of the technical system;

af denotes a number for a function of the respective component;

nff denotes a number for a malfunction of a function.

In this case, the content of the form editor can be read such that, by way of example, for the follower control device component, a possible fault for the function of automatic adjustment D<50 mm is that the adjustment does not start or does not work 303 (cf..1.1.b.1 in column for the possible faults in the form from FIGS. 3A and 3B).

This possible fault may have various fault causes, for example a voltage dropout on the drive 304, a faulty motor, 305, a faulty encoder 306, an incorrectly connected encoder 307 or any encoder/cable breakage 308.

Figure 3C:
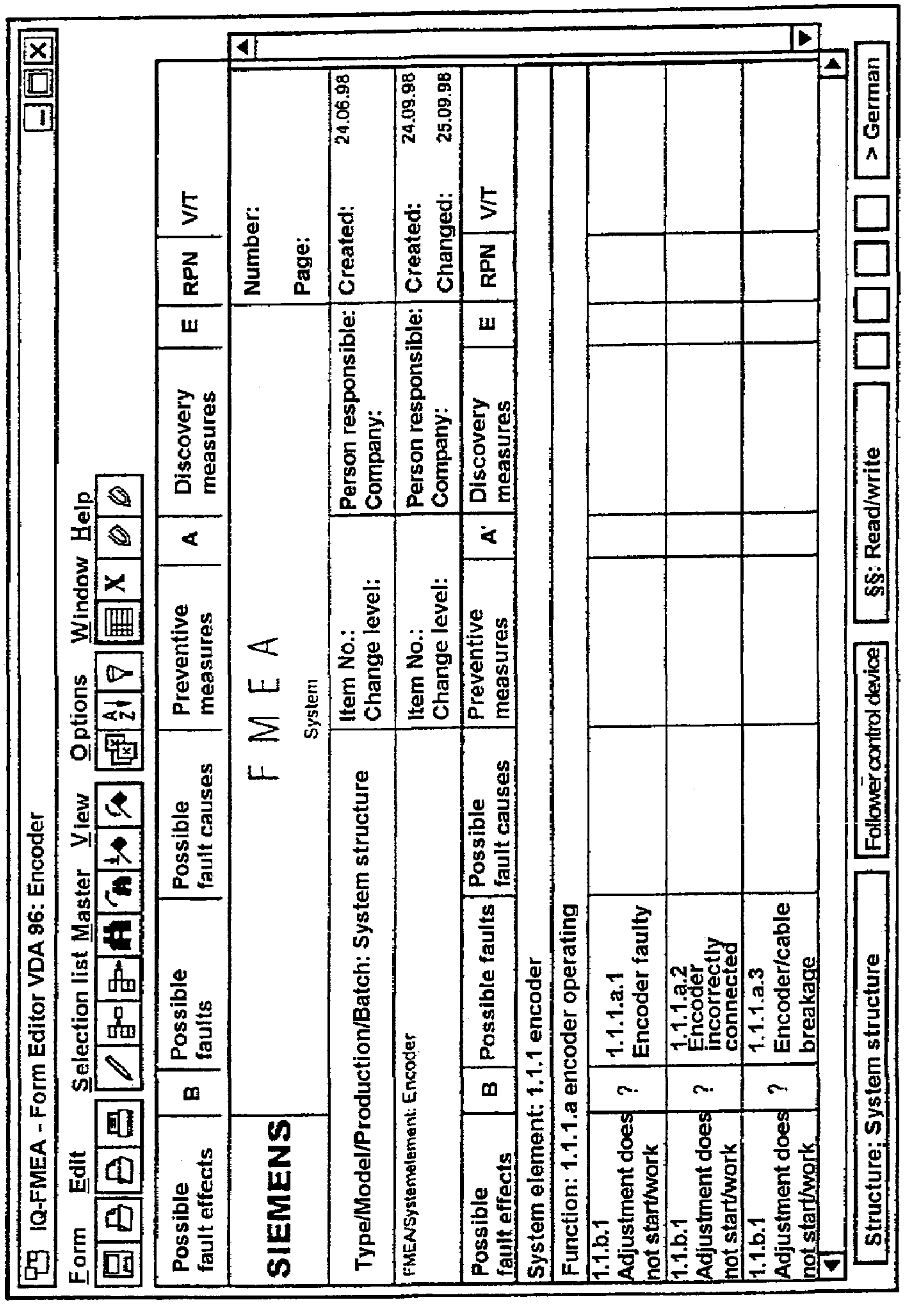

FIG. 3C shows the form editor for the encoder subcomponent within the follower control device with possible faults of the encoder and possible effects of the faults.

Figure 4:
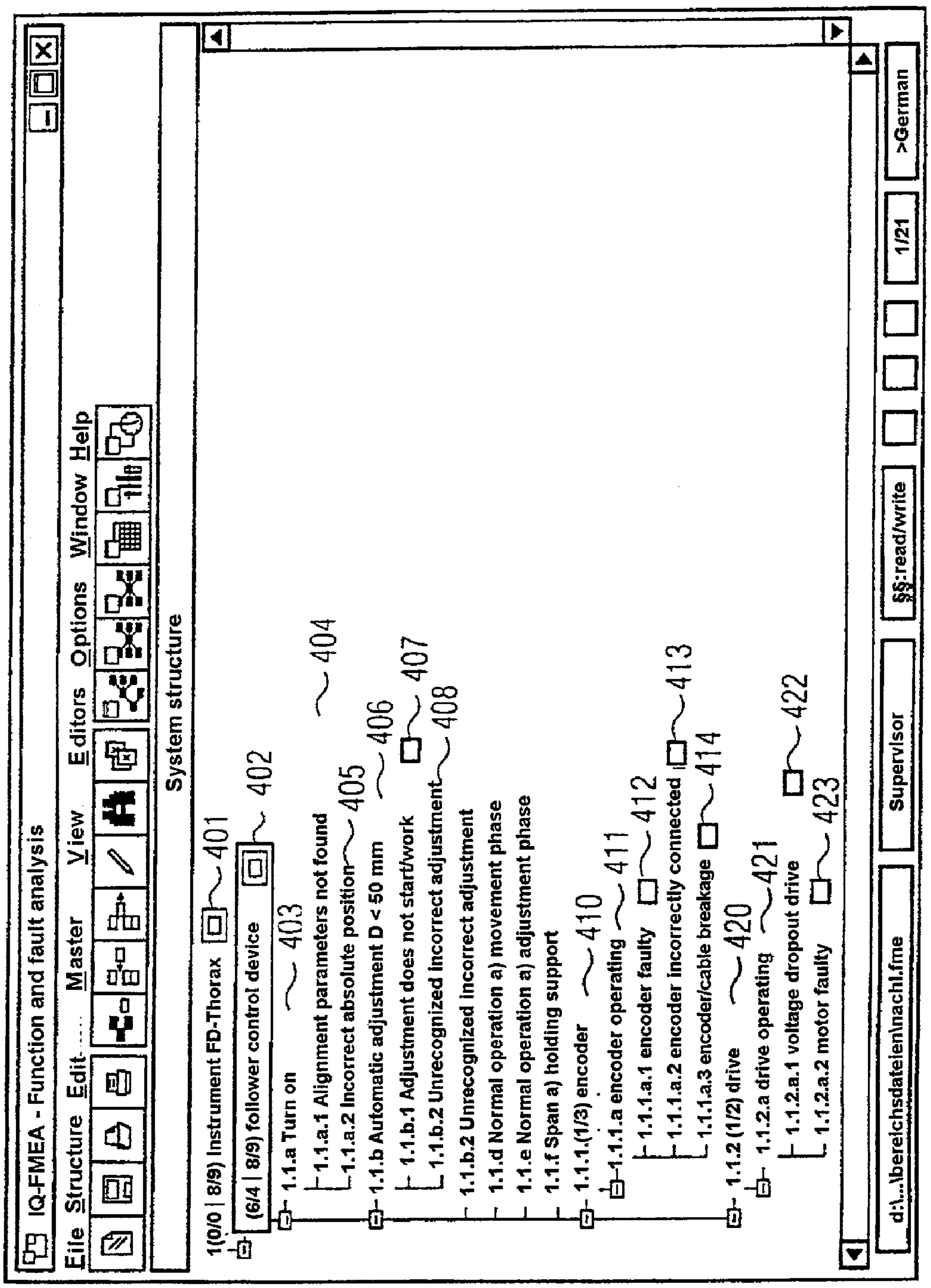
FIG. 4 shows a view of the structure editor, in which the hierarchical structure of the ascertained faults are shown in accordance with the failure modes and effects analysis from the exemplary embodiment.

FIG. 4 shows a hierarchical structure for the fault description for the technical system FD-Thorax 401, said hierarchical structure being derived from the fault description contained in the form.

The follower control device component 402 is under observation.

A turn-on operation 403 may be faulty if alignment parameters are not found 404 or an incorrect absolute position is used 405.

An automatic adjustment D<50 mm 406 is faulty if the adjustment does not work or does not start 407 or an unrecognized incorrect adjustment is made 408. The function of an encoder as a subcomponent of the follower control device (cf. 410) is described by virtue of its operating 411. This function is performed incorrectly if the encoder is faulty 412, the encoder is incorrectly connected 413 or if there is any encoder/cable breakage 414. Another subcomponent of the follower control device 402 is a drive 420. The drive does not operate (function 421) if there is a voltage dropout on the drive 422 or the motor is faulty 423.

This structure information in the form of a fault description for the technical system is available as an electronically stored file.

Figure 5:
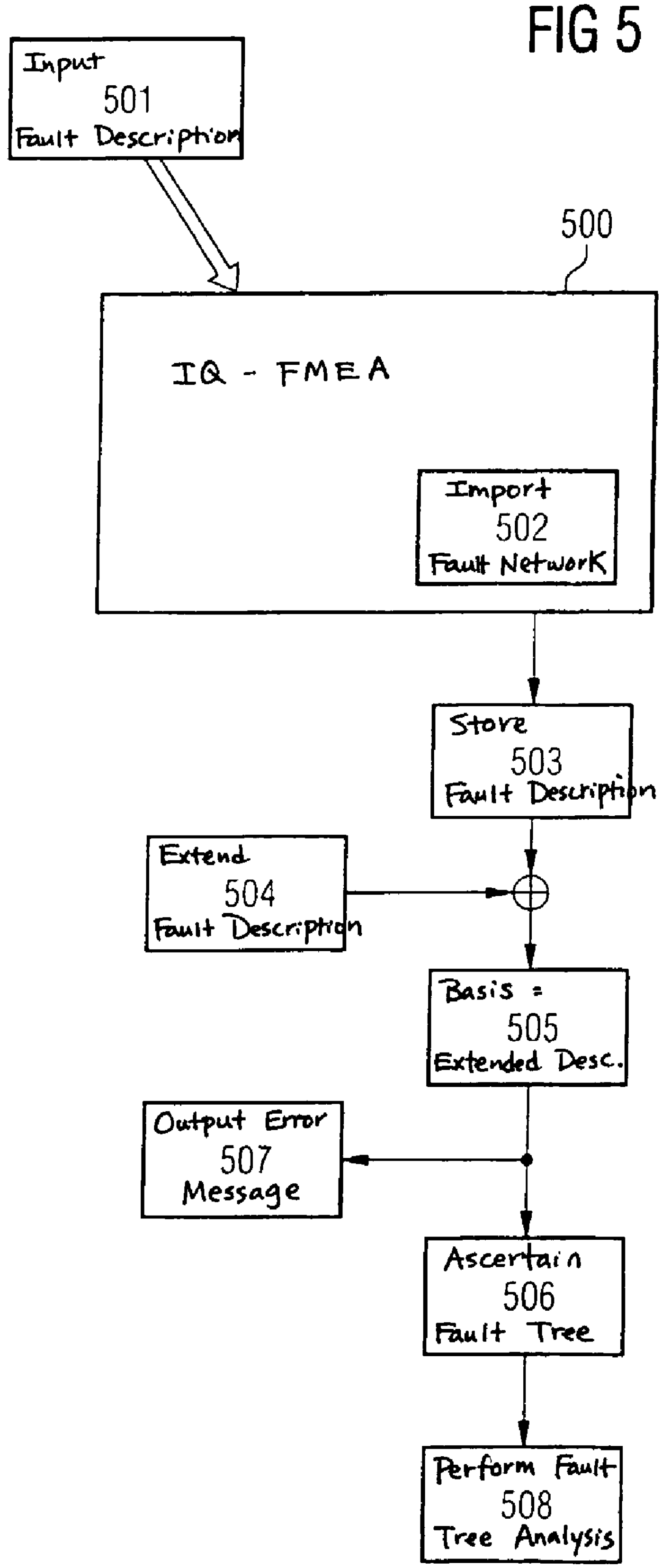
FIG. 5 shows a detailed sketch showing the individual method steps of the exemplary embodiment.

This is also shown in FIG. 5 in symbol form by a step of inputting the fault description (step 501) into the program IQ-FMEA 500. Taking the fault network shown in FIG. 4 as a basis (502), the fault description is stored in a database 503. The fault description is extended by further structure information relating to the technical system or the possible faults therein (step 504).

For all possible elemental faults, that is to say for all faults which cannot be attributed to other faults within the fault description, frequencies of occurrence, that is to say likelihoods of occurrence, are determined and are assigned to the respective elemental fault.

In addition, other dependencies between faults can be added in the fault description.

Taking the fault description extended by faults as a basis 505, a fault tree 506 is now ascertained in line with the practice below.

A fault event is prescribed which is used to indicate a desired fault event to be examined within the technical system.

For the prescribed fault event, all the technical system's component malfunctions which can lead to this fault event are ascertained.

In a recursive procedure, for all faults ascertained, the respective fault causes leading to the respective fault are ascertained. On the basis of this recursive sequence, descending hierarchically in the logical way of observing the technical system, the fault tree is formed. The defined dependencies based on the extended fault description from the failure modes and effects analysis link the faults. This is continued until all faults have been attributed to elemental faults. Taking the frequencies of occurrence of the elemental faults as a basis, the individual likelihoods of occurrence are linked in the hierarchically opposite direction to the event such that a frequency of occurrence of the prescribed fault event is determined.

This practice has, in particular, the inherent advantage that possible inconsistencies within the fault description are automatically ascertained and are output as error messages 507. These may in turn be used to improve the fault description. This ensures that the fault tree ascertained is formed on a consistent fault description from the failure modes and effects analysis.

In a further step (step 508), fault tree analysis is performed on the fault tree.

The text below illustrates a few alternatives to the exemplary embodiment described above.

The fault tree produced using the method described above can be used for various purposes:

- description of the fault generation or propagation of incorrect action by part of the technical system within the context of safety analysis or reliability analysis for the system,
- analysis of different variants of the technical system, for example within the context of test case generation.

If the structure of the technical system has been altered, the fault tree can be produced very easily by simple addition of a complementary fault tree which describes the incorrect action of the respective component.

The invention has been described in detail with particular reference to preferred embodiments thereof and examples, but it will be understood that variations and modifications can be effected within the spirit and scope of the invention.

What is claimed is:

1. A method for determining a fault tree for a technical system, using a computer, comprising:

describing faults which can occur in the technical system, using a fault description, the fault description comprising data which have been determined using failure modes and effects analysis, extending the fault description by information regarding the dependency of possible faults on one another and the frequency of occurrence of said possible faults, to thereby form an extended fault description, using the extended fault description to determine, for a prescribed fault event, the fault tree describing the dependencies of possible faults which can lead to the fault event, and the frequency of occurrence of the fault event.

2. The method as claimed in claim 1, wherein the fault tree is determined from the extended fault description for the fault event in the following manner:

the fault event is taken as a basis for determining all the possible faults which can lead to the fault event on a descending hierarchical level of the fault description until elemental faults which themselves can no longer be caused by other faults have been determined for all faults, for each elemental fault, the frequency of occurrence of the elemental fault is determined, and on the basis of the frequencies of occurrence of the elemental faults, the frequency of occurrence of the fault event is determined.

3. The method as claimed in claim 1, used for fault analysis in the technical system.

4. The method as claimed in claim 1, wherein the fault tree is altered in terms of prescribable boundary conditions.

5. The method as claimed in claim 4, wherein the alteration is made by adding a complementary fault tree.

6. The method as claimed in claim 2, used for fault analysis in the technical system.

7. The method as claimed in claim 6, wherein the fault tree is altered in terms of prescribable boundary conditions.

8. The method as claimed in claim 7, wherein the alteration is made by adding a complementary fault tree.

9. A system for ascertaining a fault tree for a technical system, comprising:

a description unit to describe faults which can occur in the technical system using a fault description, the fault description comprising data which have been determined using failure modes and effects analysis, an extender to extend the fault description by information regarding the dependency of possible faults on one another and the frequency of occurrence of said faults, the extender producing an extended fault description, a fault tree unit to determine the fault tree for a prescribed fault event, using the extended description, the fault tree describing the dependencies of possible faults which can lead to the fault event, and the frequency of occurrence of the fault event.

10. The system as claimed in claim 9, wherein the fault tree is determined from the extended fault description for the fault event in the following manner:

the fault event is taken as a basis for determining all the possible faults which can lead to the fault event on a descending hierarchical level of the fault description until elemental faults which themselves can no longer be caused by other faults have been determined for all faults, for each elemental fault, the frequency of occurrence of the elemental fault is determined, and on the basis of the frequencies of occurrence of the elemental faults, the frequency of occurrence of the fault event is determined.

11. The system as claimed in claim 9, used for fault analysis in the technical system.

12. The system as claimed in claim 9, wherein the processor is set up such that the fault tree is altered in terms of prescribable boundary conditions.

13. The system as claimed in claim 12, wherein the processor is set up such that the alteration is made by adding a complementary fault tree.

14. The system as claimed in claim 10, used for fault analysis in the technical system.

15. The system as claimed in claim 14, wherein the processor is set up such that the fault tree is altered in terms of prescribable boundary conditions.

16. The system as claimed in claim 15, wherein the processor is set up such that the alteration is made by adding a complementary fault tree.

17. A computer-readable medium storing a program for controlling a computer, to perform a method for determining a fault tree for a technical system, the method comprising:

describing faults which can occur in the technical system, using a fault description, the fault description comprising data which have been determined using failure modes and effects analysis, extending the fault description by information regarding the dependency of possible faults on one another and the frequency of occurrence of said possible faults, to thereby form an extended fault description, using the extended fault description to determine, for a prescribed fault event, the fault tree describing the dependencies of possible faults which can lead to the fault event, and the frequency of occurrence of the fault event.

* * * * *